US012303925B2

(12) United States Patent
Antypas et al.

(10) Patent No.: US 12,303,925 B2
(45) Date of Patent: May 20, 2025

(54) SYSTEM AND METHOD FOR MAGNETICALLY INDUCED ELECTROSPRAY THRUSTERS

(71) Applicant: University of Southern California, Los Angeles, CA (US)

(72) Inventors: Robert Antypas, Los Angeles, CA (US); Joseph Wang, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 18/260,244

(22) PCT Filed: Jan. 3, 2022

(86) PCT No.: PCT/US2022/011049

§ 371 (c)(1),
(2) Date: Jul. 1, 2023

(87) PCT Pub. No.: WO2022/147507

PCT Pub. Date: Jul. 7, 2022

(65) Prior Publication Data

US 2023/0372954 A1 Nov. 23, 2023

Related U.S. Application Data

(60) Provisional application No. 63/133,747, filed on Jan. 4, 2021.

(51) Int. Cl.
*B05B 5/025* (2006.01)
*B05B 5/053* (2006.01)
*B05B 5/16* (2006.01)

(52) U.S. Cl.
CPC .......... *B05B 5/0255* (2013.01); *B05B 5/0533* (2013.01); *B05B 5/1608* (2013.01)

(58) Field of Classification Search
None
See application file for complete search history.

(56) References Cited

U.S. PATENT DOCUMENTS 4,925,103 A 5/1990 Muench et al.
6,497,796 B1 12/2002 Ashtiani et al.
(Continued)

OTHER PUBLICATIONS

King "Electrospray from Magneto-electrostatic Instabilities" (Year: 2015).*
(Continued)

*Primary Examiner* — Arun Goyal
*Assistant Examiner* — William L Breazeal
(74) *Attorney, Agent, or Firm* — Snell & Wilmer L.L.P.

(57) ABSTRACT

A device and method for emitting an electrospray of ionized particles is disclosed, comprising a reservoir, an emitter in communication with the reservoir and having openings, wherein the openings are configured to permit release of the liquid media therefrom in response to a dynamic magnetic field; and an element for generating a dynamic magnetic field that runs through the emitter. The element may comprise two orthogonal Helmholtz coil pairs. In another example embodiment, an electrospray thruster is disclosed. The electrospray thruster may comprise: a reservoir for accommodating a volume of liquid media capable of being ionized; an emitter grid comprising a plurality of emitters, wherein each emitter of the plurality of emitters is in communication with the reservoir and comprises an opening disposed therethrough; and an element for causing the liquid media to be ionized from the emitter by a dynamic magnetic field.

24 Claims, 11 Drawing Sheets

(56) References Cited

U.S. PATENT DOCUMENTS

| | | | |
|---|---|---|---|
| 2002/0023427 | A1 | 2/2002 | Mojarradi et al. |
| 2020/0126779 | A1 | 4/2020 | Arnold |

OTHER PUBLICATIONS

International Search Report dated May 31, 2022 in corresponding International Application No. PCT/US2022/011049 filed Jan. 3, 2022; total 4 pages.

Written Opinion of the International Searching Authority dated May 31, 2022 in corresponding International Application No. PCT/US2022/011049 filed Jan. 3, 2022; total 8 pages.

* cited by examiner

SYSTEM AND METHOD FOR MAGNETICALLY INDUCED ELECTROSPRAY THRUSTERS

PRIORITY CLAIM

This application is a U.S. National Stage entry under 35 U.S.C. § 371 of International Application No. PCT/US2022/011049 filed Jan. 3, 2022, which claims priority to, and the benefit of U.S. provisional patent application No. 63/133,747, titled “MAGNETICALLY INDUCED ELECTROSPRAY THRUSTERS”, filed Jan. 4, 2021, which applications are hereby incorporated by reference in their entirety.

FIELD

This disclosure generally relates to system and method for electrospray emission, and more particularly, to electrospray emission in end-use applications such as thrusters used in space.

BACKGROUND

Electrospray devices typically comprise one or more emitters and an extractor grid. These extractor type electrospray devices use a static electric field between the one or more emitters and the extractor to cause a release of ionized particles from the one or more emitters, to accelerate these ionized particles, and to emit these ionized particles from the extractor at a desired velocity. While these extractor type electrospray devices are capable of performing in such applications as thrusters used in space, they suffer from issues of scalability due to very tight manufacturing tolerances, and the use of an extractor in such know device may operate to reduce or limit the practical service life of such devices. It is, therefore, desired, that electrospray devices and methods for using the same be developed in a manner that addresses the shortcomings of such known devices.

SUMMARY

In accordance with various example embodiments, a device for emitting an electrospray of ionized particles is disclosed. The device may comprise a reservoir for accommodating a volume of liquid media capable of being ionized; an emitter in communication with the reservoir and comprising one or more openings disposed therethrough, wherein the openings are configured to permit release of the liquid media therefrom in response to a dynamic magnetic field; and an element for generating a dynamic magnetic field that runs through the emitter, wherein the element is positioned off axis from the emitter.

In further example embodiments, the element comprises two orthogonal Helmholtz coil pairs, wherein the Helmholtz coil pairs generate a dynamic magnetic field that causes ionized particles exiting the emitter to be propelled away from the device in a direction orthogonal to the pair of coils.

In another example embodiment, a method for emitting an electrospray of ionized particles at a desired velocity is disclosed. The method may comprise the steps of generating a desired dynamic magnetic field in a device that comprises an emitter to facilitate the release of a liquid media capable of being ionized therefrom, wherein in response to the dynamic magnetic field the liquid media is released from the emitter in the form of ionized particles, wherein the ionized particles are propelled away from the device at a desired velocity.

In another example embodiment, an electrospray thruster is disclosed. The electrospray thruster may comprise: a reservoir for accommodating a volume of liquid media capable of being ionized; an emitter grid comprising a plurality of emitters, wherein each emitter of the plurality of emitters is in communication with the reservoir and comprises an opening disposed therethrough; and an element for causing the liquid media to be ionized from the emitter by a dynamic magnetic field.

BRIEF DESCRIPTION OF DRAWINGS

A more complete understanding of the present disclosure may be derived by referring to the detailed description and claims when considered in connection with the Figures, wherein like reference numbers refer to similar elements throughout the Figures, and:

FIG. 2 is a schematic drawing of an example imaging system in accordance with various embodiments;

DETAILED DESCRIPTION

Electrospray devices and methods are disclosed herein that avoid the use of an extractor as used in such conventional devices discussed above that operate to provide a static electrical field to cause release and acceleration of ionized particles. Rather, electrospray devices as disclosed herein are configured to provide a changing or dynamic magnetic field to thereby enable the release and acceleration of ionized particles from one or more emitters avoiding the need for an extractor, thereby both promoting the ability to scale such electrospray device and improving/increasing the service life of such electrospray device.

In accordance with various example embodiments, a thruster system is provided. In an example embodiment, the thruster system is a magnetically induced electrospray thruster system.

Figure 1:
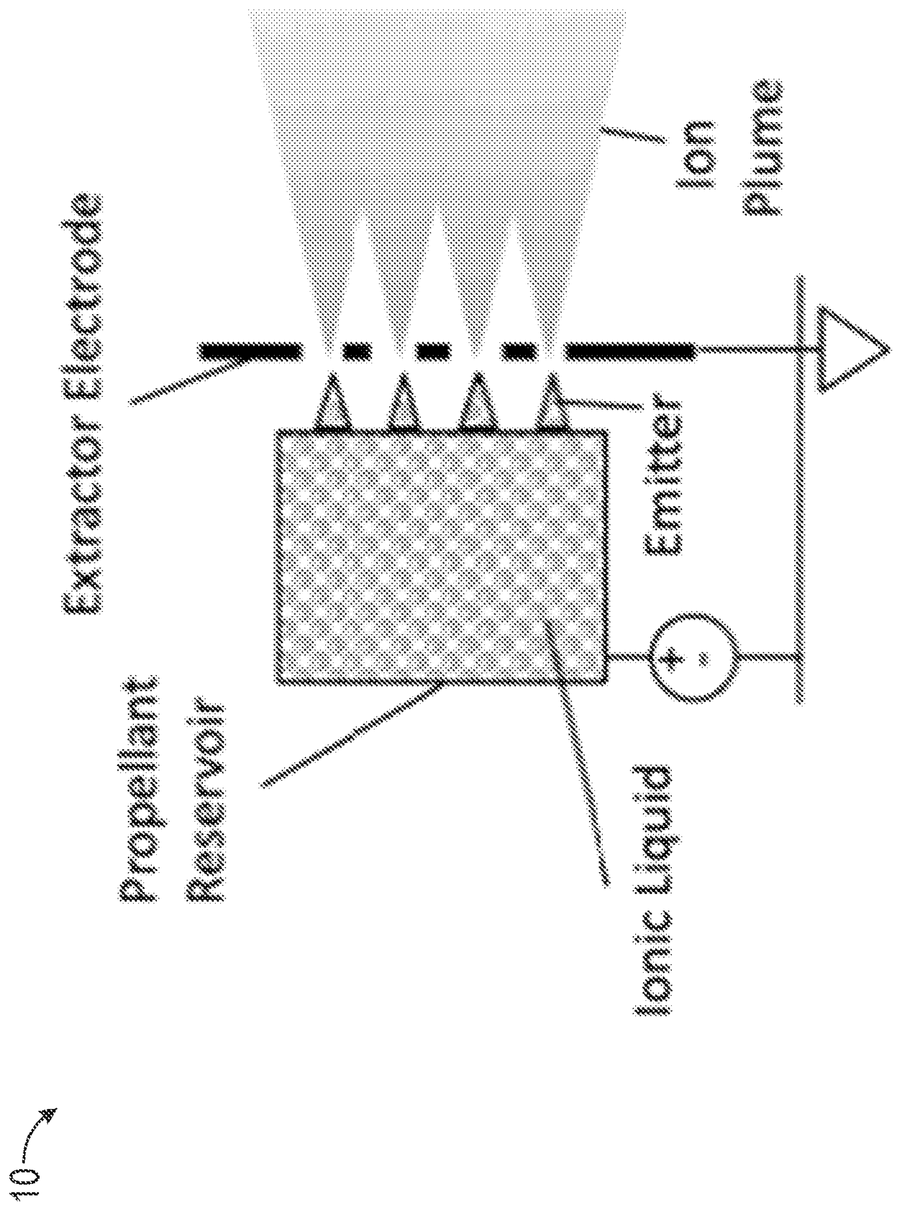
FIGS. 1-3 are prior art extractor type electrospray devices.
Figure 2:
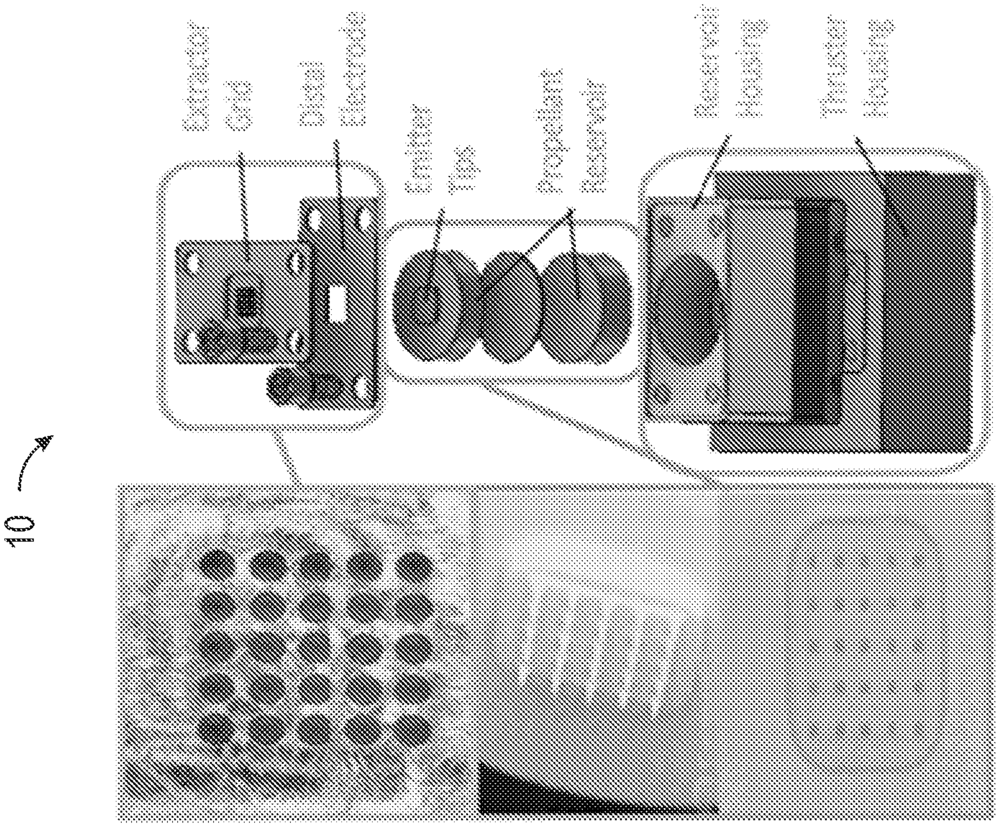
Figure 3:
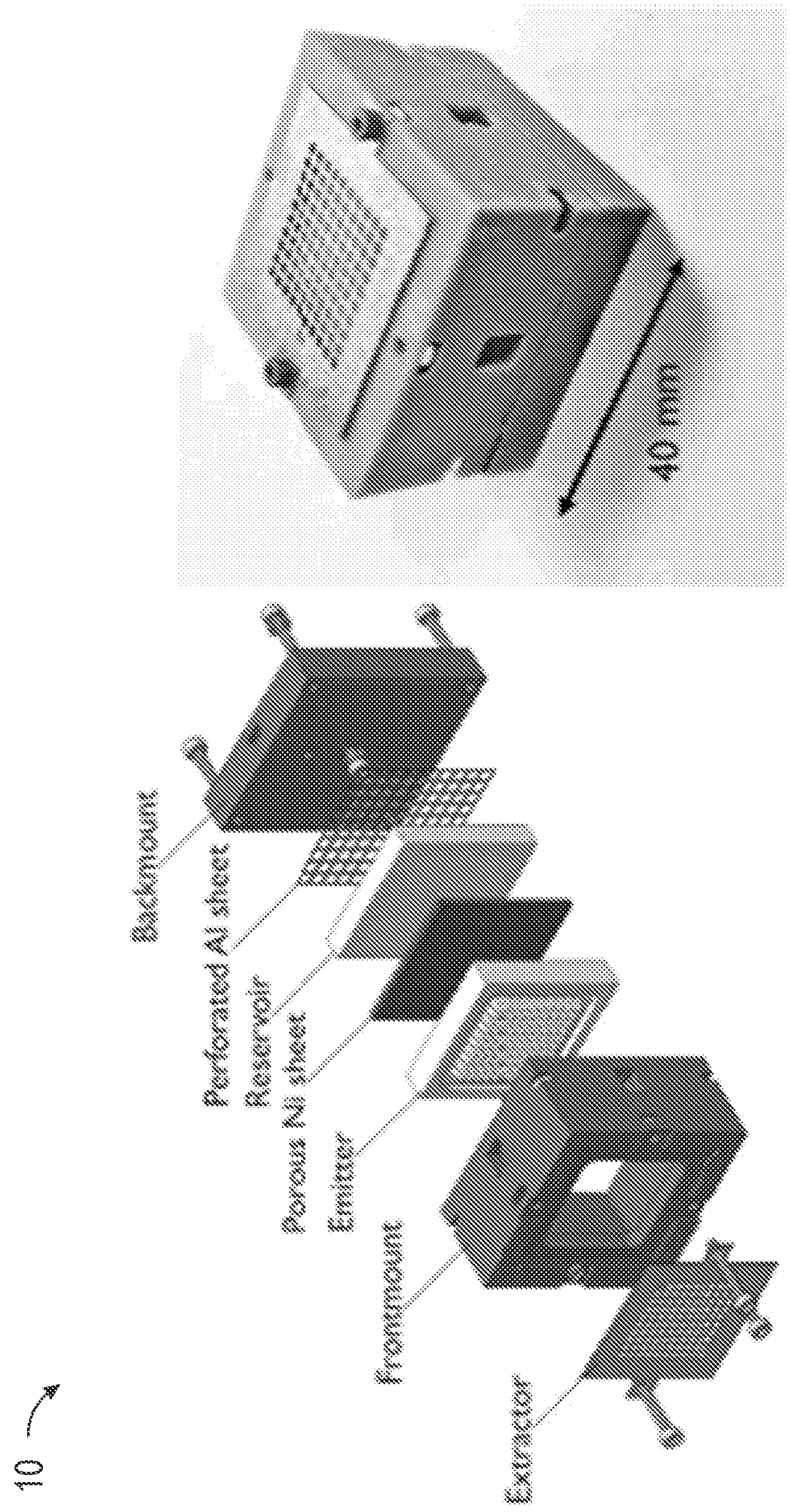

With reference now to FIGS. 1-3, a prior art electrospray device 10 may comprise a propellant reservoir, a plurality of emitters, and an extractor electrode. The extractor electrode may comprise holes. Each hole is aligned above one or more of the emitters. Thus, in an example embodiment, such as illustrated in FIGS. 2-3, an array of emitters may be aligned with an array of holes, and the extractor may be called an extractor grid. The propellant reservoir may contain an ionic liquid. A voltage potential may be placed between the emitters and the extractor to accelerate ions from the ionic liquid through holes in the extractor electrode. The voltage potential is a fixed voltage potential, such as 800V-2000V.

The electrospray device 10 generates a constant thrust in a fixed direction at a given potential. As described herein, an extractor type electrospray device has a number of disadvantages that the present disclosure can address.

Figure 4:
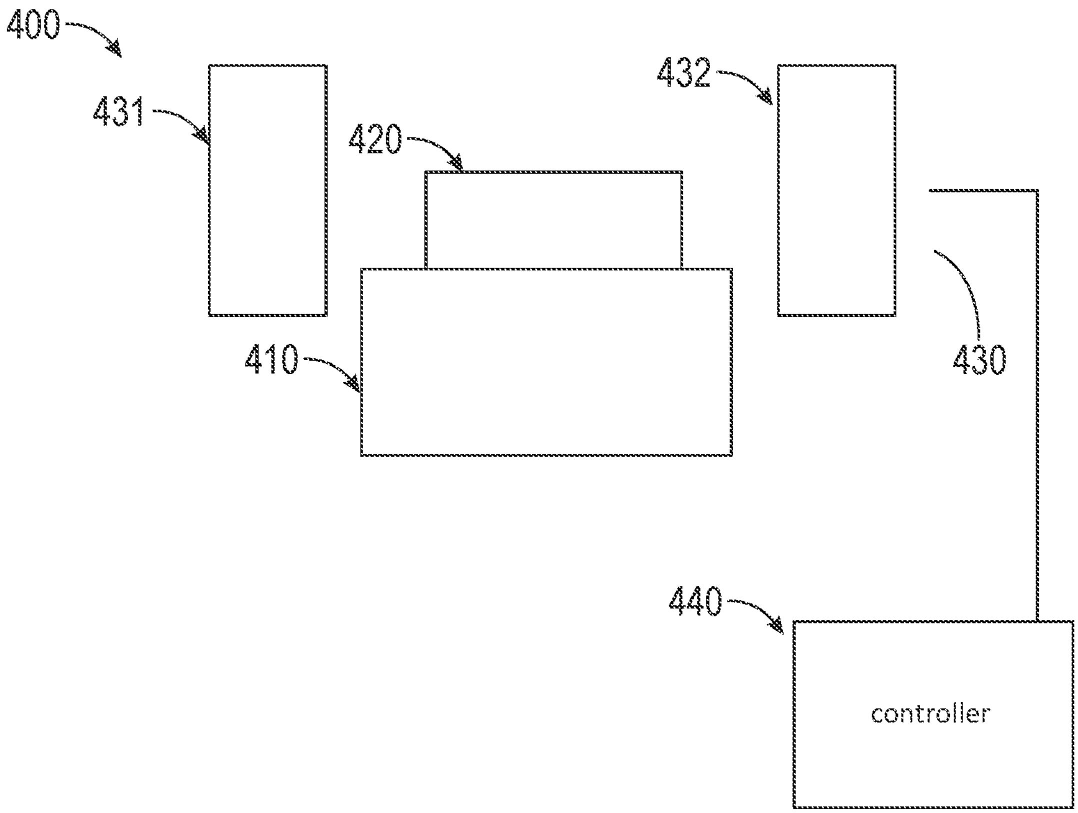
FIG. 4 is a block diagram of a extractorless electrospray device in accordance with various embodiments.
Figure 5:
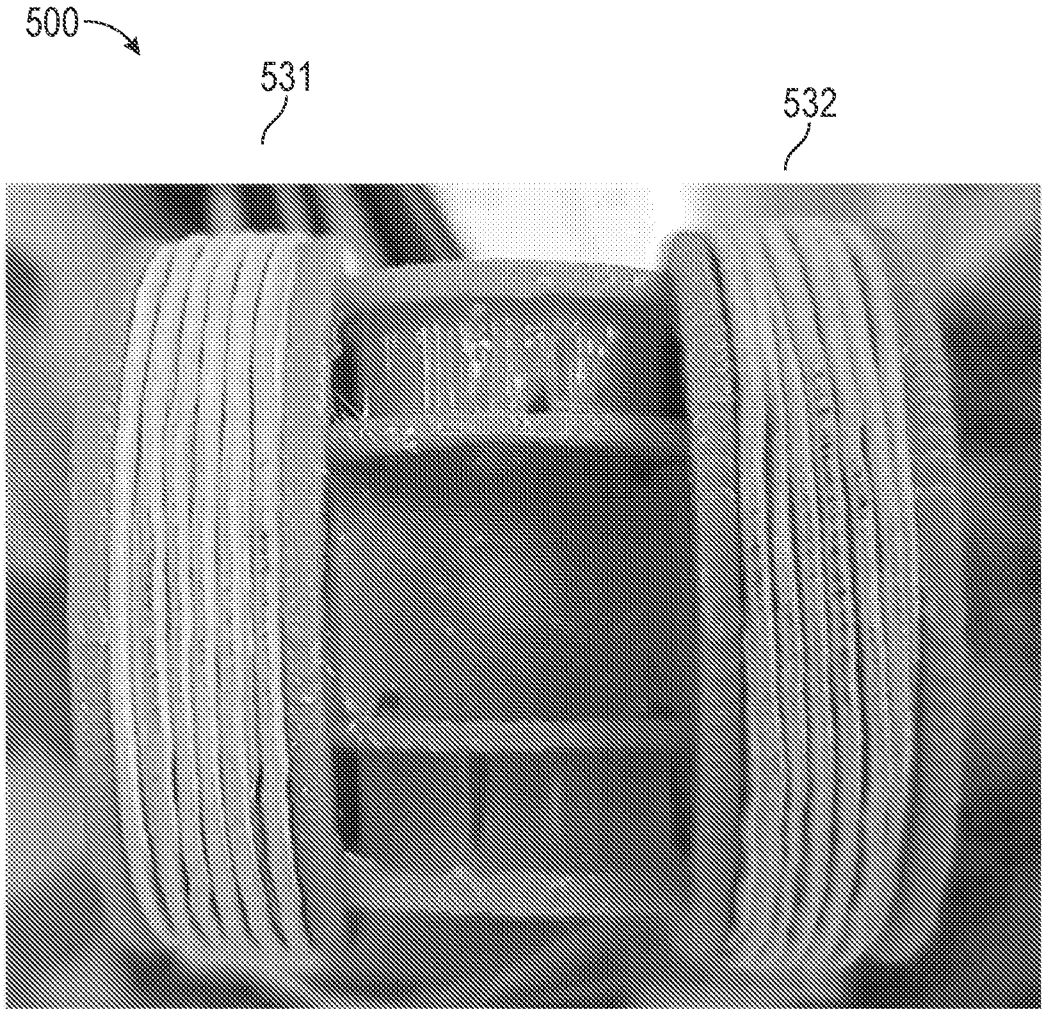
FIG. 5 is a top view of an extractorless electrospray device in accordance with various embodiments.
Figure 6:
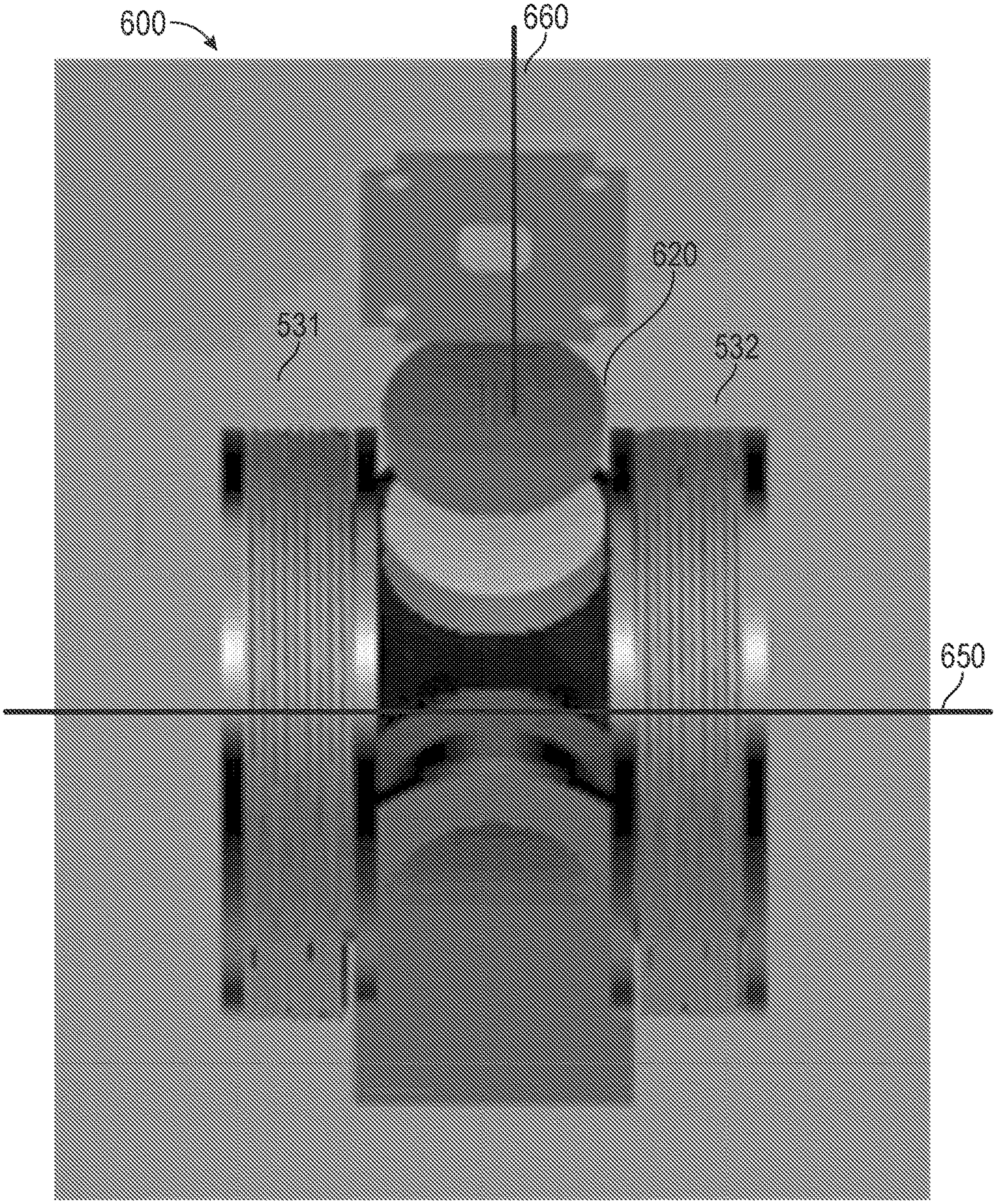
FIG. 6 is a perspective view drawing of another example extractorless electrospray device in accordance with various embodiments.
Figure 7:
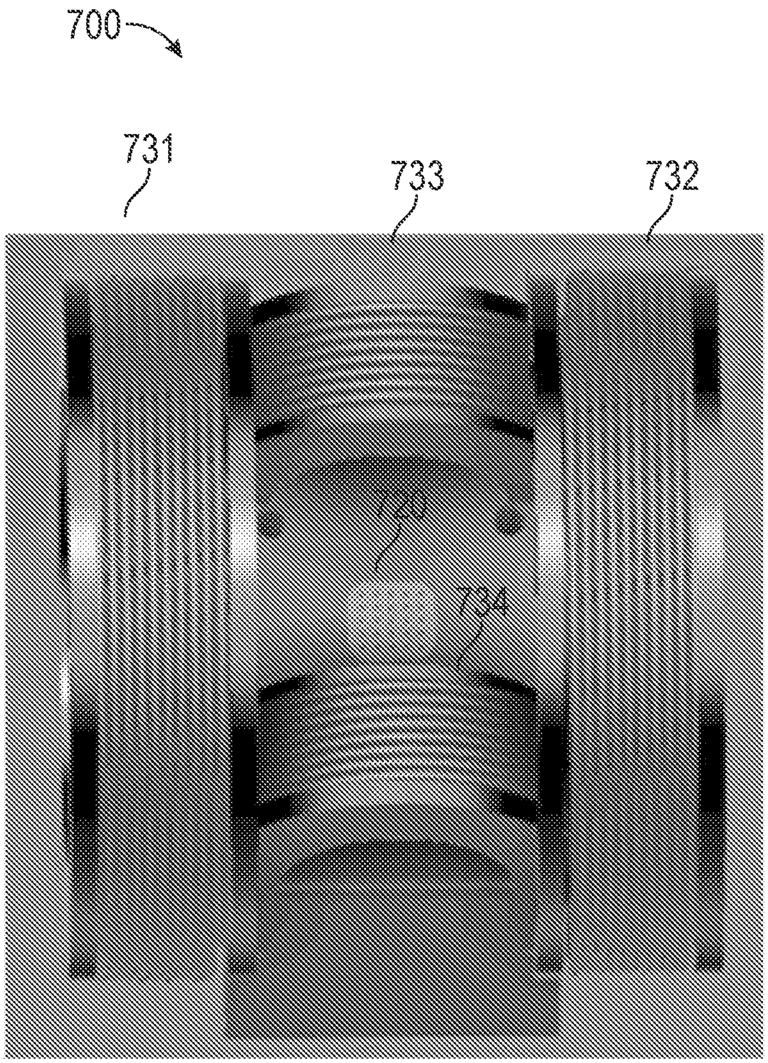
FIG. 7 is a perspective view drawing of yet another example extractorless electrospray device, having four coils, in accordance with various embodiments.

With reference now to FIG. 4, an electrospray device 400 is illustrated. Electrospray device 400 is configured to emit an electrospray of ionized particles. In an example embodiment, electrospray device 400 is a thruster. In an example embodiment, the electrospray device is a passively fed electromagnetic electrospray thruster. In an example embodiment, the electrospray device 400 is a Field-Emission Electric Propulsion thruster. In an example embodiment, electrospray device 400 is a magnetically induced electrospray thruster. In an example embodiment, electrospray device 400 comprises a reservoir 410, an emitter 420, and an element 430.

The reservoir 410 may be configured to contain a source of ionic material to be ionized. The reservoir 410 may be called a propellant reservoir. In an example embodiment, the ionic material may be an ionic liquid. In an example embodiment, the ionic material may be liquid metal. In various example embodiments, the ionic material can be Indium, Cesium, 1-ethyl-3methylimidazolium-tetrafluoroborate (EMI-BF4) propellant, or the like. In an example embodiment, the ionic material may be configured to generate positive and/or negative ions. In an example embodiment, reservoir 410 is configured to accommodate a volume of ionic liquid. In an example embodiment, the reservoir is a volume of fluid or a volume of fluid suspended in a porous media. In another example embodiment, the reservoir is a tank configured to hold the volume of ionic material. In an example embodiment, a porous media may be configured to facilitate capillary flow of the ionic material from the tank to the emitter. In another example embodiment, the tank may further comprise a pump for conveying the fluid to the emitter. Moreover, the reservoir may be configured in any suitable way to be in communication with the emitter 420 for providing ionic liquid to the emitter.

The emitter 420 may be configured to function as a colloid thruster, accelerating droplets or clumps of molecules. The emitter 420 may, alternately, be configured to function as a Pure Ionic Thruster accelerating single monomer or dimer molecules. In one example embodiment, the emitter emits both positive and negative ions. from the same thruster emitter chip. In an example embodiment, the emitter is cone shaped. In an example embodiment, the peaks are porous cones made of borosilicate or silica. In another example embodiment, the emitter is a capillary needle. In another example embodiment, the emitter is a linear emitter with a peak that runs the length of the emitter. In various example embodiments, the emitter is passively fed, force fed via a pumping apparatus, and/or the like. Moreover, the emitter can be any suitable shape and/or structure for emitting ions from the reservoir 410. In an example embodiment, the emitter is a borosilicate emitter disk. In another example embodiment, the emitter is a passive emitter comprising borosilicate (glass), porous silica, or porous metal (e.g., nickel titanium steel). In an example embodiment, the thruster tip density is 345 emitters/cm^2. In another example embodiment, the thruster tip density is greater than 2000 emitters/cm^2, or greater than 2400 emitters/cm^2, however any suitable density may be used. In an example embodiment, the emitter is configured to emit when an electric field, created by a dynamic magnetic field, excites the ions from the reservoir 410. In an example embodiment, the emitter 420 is in communication with the reservoir 410 and comprises an opening configured to permit release of the liquid media (as ions) in the reservoir in response to a dynamic magnetic field.

In various example embodiments, the emitter 420 is a single emitter, a linear array of emitters, or a two-dimensional array of emitters (emitter grid). The emitter 420 may comprise any suitable number of emitter elements.

In accordance with various example embodiments, the element 430 may comprise an electromagnet. In an example embodiment, the element 430 is configured to accelerate ions with a dynamic magnetic field. Instead of using a static electric field, a dynamic magnetic field can be used to generate a quasi-static electric field in the emitter. In an example embodiment, the dynamic magnetic field is generated by a Helmholtz coil. Moreover, the element 430 may be any suitable electromagnet that can generate a dynamic magnetic field. In an example embodiment, the magnetic field is oscillated at high frequency. In accordance with Faraday's law, the electrospray device comprises a controller 440 that is configured to dynamically change a magnetic field that runs through the emitters to generate a virtual electric field to accelerate ions without the need for an extractor.

In one example embodiment, the element 430 may comprise a first electromagnet 431. In various example embodiments, the element 430 may comprise a first electromagnet 431 and a second electromagnet 432. In an example embodiment, the use of two orthogonal Helmholtz coil pairs allows for beam stabilization and/or thrust vectoring. With reference now to FIGS. 4-7, a top view of an example electrospray device 400/500/600/700 is shown with a first electromagnet 531 and second electromagnet 532 illustrated. In this example embodiment, each electromagnet 531/532, 631/632, 731/732 is a Helmholtz coil that is coiled around a recess to form two coils that have a common axis (a "coil axis") 650 running through the middle of the two coils. An emitter 420 or an array of emitters 620 maybe located in-between the two coils. In one example embodiment, the emitters are located with the tips of the emitters approximately at the center of the field generated by the coils. In an example embodiment, the emitters are approximately at the 'equator' of the coils.

Moreover, in an example embodiment, the coils are located 'off-axis', meaning that they are located to not block the path of the emissions. Stated another way, the emitters may be oriented perpendicular to an emitter plane. In an example embodiment, the emitter plane may have an emitter direction 660 that is perpendicular to the emitter plane. Moreover, in an example embodiment, the coil axis may be perpendicular to the emitter direction. In accordance with various example embodiments, displacement of the ions is orthogonal to both matched coil pairs and in the desired direction of thrust.

Moreover, in an example embodiment, the electrospray device 400 is configured to operate the first electromagnet independently of the second electromagnet to steer the thrust in a first thrust plane. In a further example embodiment, with momentary reference to FIG. 7, the electrospray device 700 may further comprise a third electromagnet 733 and a fourth electromagnet 734. In this example embodiment, the third electromagnet 733 and fourth electromagnet 734 are configured to provide thrust steering in a second thrust plane that is perpendicular to the first thrust plane. Moreover any suitable number of electromagnets and planes of steering may be used.

In another example embodiment, the dynamic magnetic field is generated by a spinning magnet below the emitter plane, spinning at hundreds of kHz.

As noted above, in an example embodiment, the electrospray device 400 does not comprise an extractor. Stated another way, the electrospray device eliminates the need for an extractor. In one example embodiment, the extractorless electrospray device 400 is more resilient to wear and tear. With an extractor, perfect emission occurs when the extractor is perfectly centered above the emitter tips and each individual emitter tip is the same height and shape. These thrusters fire for thousands of hours and extract hundreds of trillions of ions every second. If even an extremely small percentage of the ions hit the extractor grid, instead of going through the extractor hole, thrust is lost and over time ionic liquid buildup may short out the electrodes. Moreover, mis-matched tip height, tip shape and overall tip to emitter alignment can lead to increased extractor impingement. Miniscule offsets in grid alignment can lead to wide degrees of off axis emission. And the uniformity of the array of emitters is also very important in an extractor type thruster. The occurrence of interception (impingement of the ions on the extractor can limit a thruster from a possible life time of tens of thousands of hours to between 1 and 2000 hours. Therefore, redundant thrusters are often required as backup to the primary thrusters.

The absence of an extractor gives rise to various advantages over an extractor type thruster. For example, the extractorless electrospray device may emit ions and produce thrust without any interception. In another example, the extractorless electrospray device may emit ions and produce thrust without loss. In another example, the extractorless electrospray device can be scaled up. It may be limited by how many emitters can be placed on a surface but not limited by tolerances associated with the extractor such as how many holes can be consistently drilled in the extractor or the flatness of the extractor. Moreover, any temperature variation or vibration can cause warping or deflection of a thin extractor (and most extractors need to be thin), but in an example embodiment the extractorless electrospray device size is not limited by and its impingement rate is unimpacted by temperature or vibration. Thus, in an example embodiment, the size of the emitter grid, of an extractorless electrospray device can be larger than 2.5 cm, whereas the size of an extractor electrospray device is limited to 2 cm or less. This limitation on an extractor electrospray device size can be due to the difficulty of achieving sufficient flatness of the electrospray device and the reduction of effectiveness of the thruster for those with an extractor. In an example embodiment, the extractorless electrospray device is configured such that it is impossible to have a short caused by impingement on an extractor. Thus, the lifetime of an extractorless electrospray device is greatly increased over that of an extractor type electrospray device. For example, by an order of magnitude of 10 or 100 or 1000 or more.

In a further example embodiment, an extractorless electrospray device is configured to provide variable thrust. In contrast, an extractor electrospray device is limited in how much one can increase the voltage to increase the thrust, because doing so increases impingement on the extractor. Thus, in an example embodiment, the extractorless electrospray device 400 is configured to increase the thrust without any degradation due to extractor impingent.

In an example embodiment, many of the above concerns with an extractor type electrospray device result in the need to break up the thrusters into many smaller thruster chips, which combined for a single thruster. The need to have many smaller thruster chips increases the complexity, weight and inert mass of the extractor thruster compared to an extractorless thruster of equal thrust capability.

In an example embodiment, the extractorless electrospray device is configured with emitter redundancy. In a conventional thruster, the entire thruster is rendered inoperable when one emitter tip (out of hundreds or thousands) is shorted to the extractor. In contrast, in an example embodiment, the extractorless thruster may continue to operate with one less emitter that fails, with the only effect that the failed emitter no longer contributes to thrust, but does not short the whole thruster out.

With reference now to FIGS. 8A, 8B, 8C, and 8D, various example embodiment wire diagrams are provided for controlling the Helmholtz coils (electromagnets 831/832/833/834). In an example embodiment, a function generator 881 is configured to generate a signal, such as a sine wave. Moreover, function generator 881 may generate any suitable function. The function generator 881 is configured to provide the signal to a waveform amplifier 882. The waveform amplifier is configured to amplify the received signal and provide it to the coils via a series capacitor 883. In an example embodiment, the capacitor performs the function of capacitive matching the inductance produced by high frequency amperage oscillation to reduce the voltage a suitable amount to drive the coil pair. Although any suitable plan may be used, in an example embodiment, the thruster operates as current is oscillated, in a sin wave between −3 and 3 Amps at a frequency of 150 kHz.

Figure 8A:
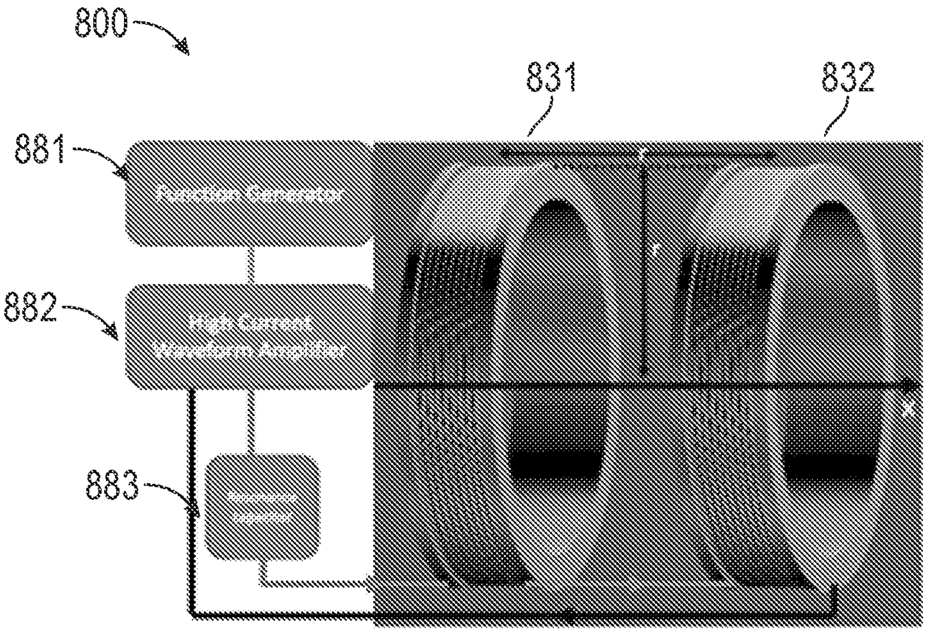
FIGS. 8A, 8B, 8C, and 8D are wire drawings of an extractorless electrospray device, in accordance with various embodiments.
Figure 8B:
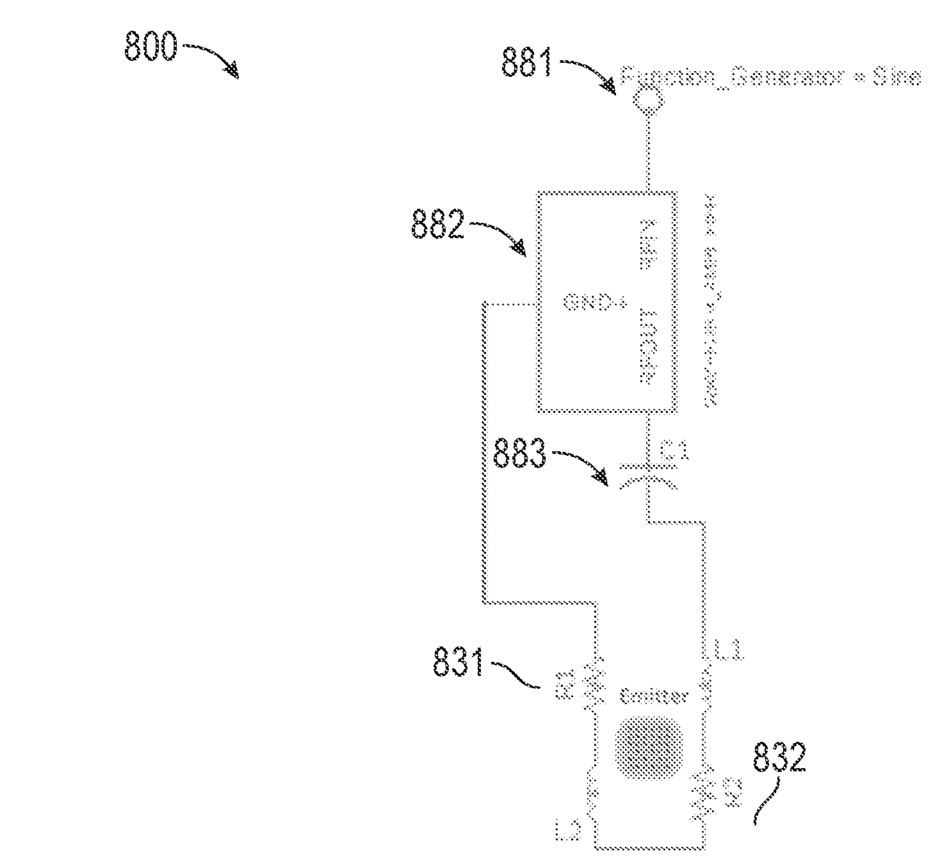
Figure 8C:
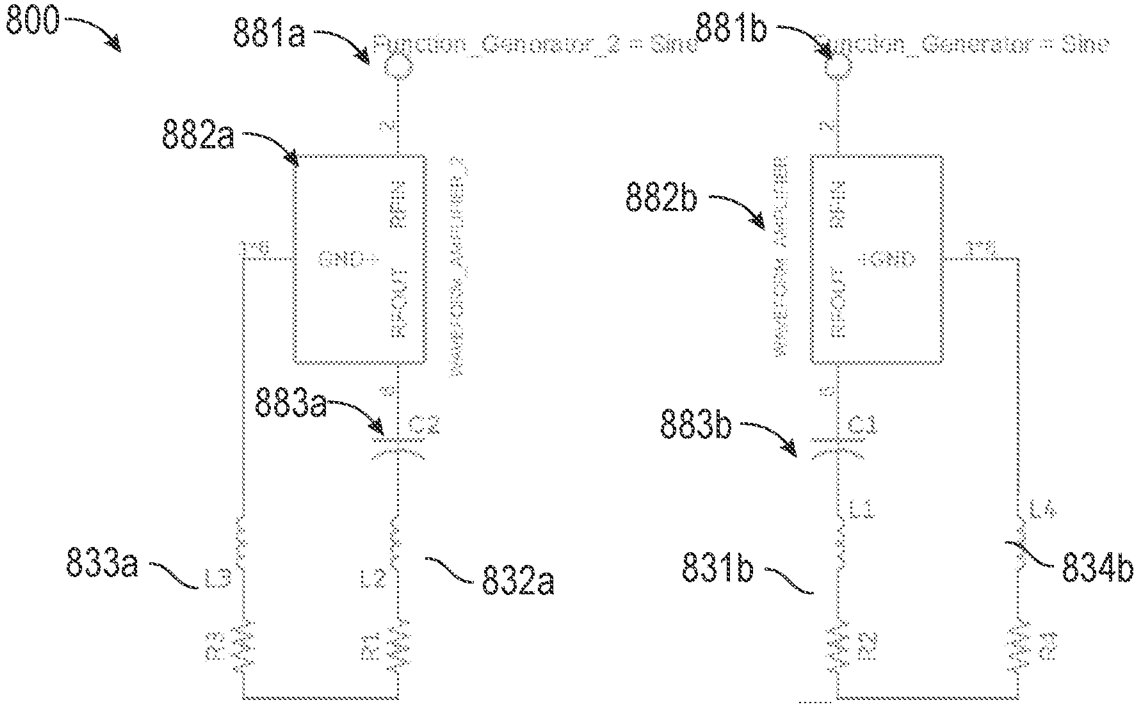

In a first example embodiment, and in accordance with FIG. 8B, the signal is provided in series to the first electromagnet 831 and then to the second electromagnet 832. In a second example embodiment, and with reference to FIG. 8C, an extractorless electrospray device 800 comprises four coils, with two 2-coil pairs. The first coil pair comprising a function generator 881*a*, providing a signal to the waveform amplifier 882*a* which amplifies the signal and provides it, via capacitor 883*a*, to coils 2, 3 (832*a* and 833*a*). Similarly the second coil pair comprises a function generator 881*b*, providing a signal to the waveform amplifier 882*b*, which amplifies the signal and provides it, via capacitor 883*b*, to coils 1, 4 (831*b* and 834*b*).

Figure 8D:
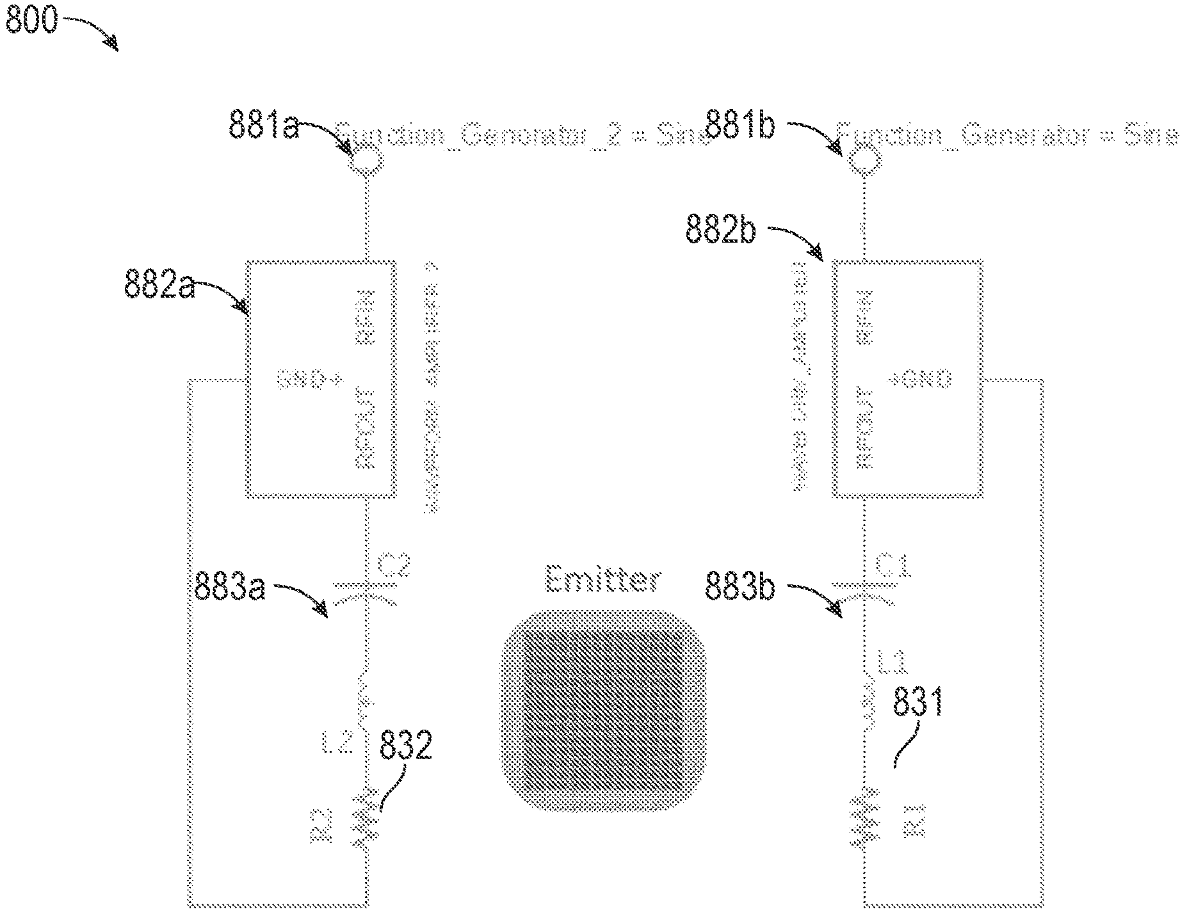

In accordance with another example embodiment, and with reference to FIG. 8D, the electrospray device 800 is configured for thrust vector individual coil operation with 2 coils (shown) and 2 further coils (not shown). In this example embodiment, the electrospray device 800 comprises a first function generator 881*a*, providing a signal to the waveform amplifier 882*a*, which amplifies the signal and provides it, via capacitor 883*a*, to electromagnet 832. Similarly, the electrospray device 800 comprises a second function generator 881*b*, providing a signal to the waveform amplifier 882*b*, which amplifies the signal and provides it, via the capacitor 883*b*, to electromagnet 831. A second pair of coils could also be controlled by a similar arrangement.

In an example embodiment electrospray device 800 comprises a function generator 881, a waveform amplifier 882, a series capacitor 883, and the Helmholtz coil—electromagnet 831/832. Moreover, any suitable system for controlling the electromagnets 831/832/833/834 may be used. In accordance with an example embodiment, the electrospray device 400 further comprises a controller 440 for controlling the amount of amplification by waveform amplifier 882 and/or the voltage level, function type, and on/off of the thruster. Controller 440 may receive input from a user or from an on-board or remote vehicle movement control system. In an example embodiment electrospray device 400 is configured to generate a dynamic magnetic field that runs through the emitter. In an example embodiment, the Helmholtz coil pairs generate a dynamic magnetic field that induces an electric potential and causes ionized particles exiting the emitter to be propelled away from the device in a direction orthogonal to the pair of coils. In an example embodiment, the Helmholtz coils are configured to generate a dynamic magnetic field to ionize the liquid media exiting the emitter and accelerate ionized particles exiting the emitter to a desired velocity.

In an example embodiment, the electrospray device 400 is configured to generate a specific impulse above 4000 s with a Thrust/Power ratio of greater than 10 μN/W, greater than 30 μN/W, or greater than 40 μN/W. The device can be scaled up to any size of thruster. Large thrusters with billions of emitters would be able to operate for many thousands of hours.

Figure 9:
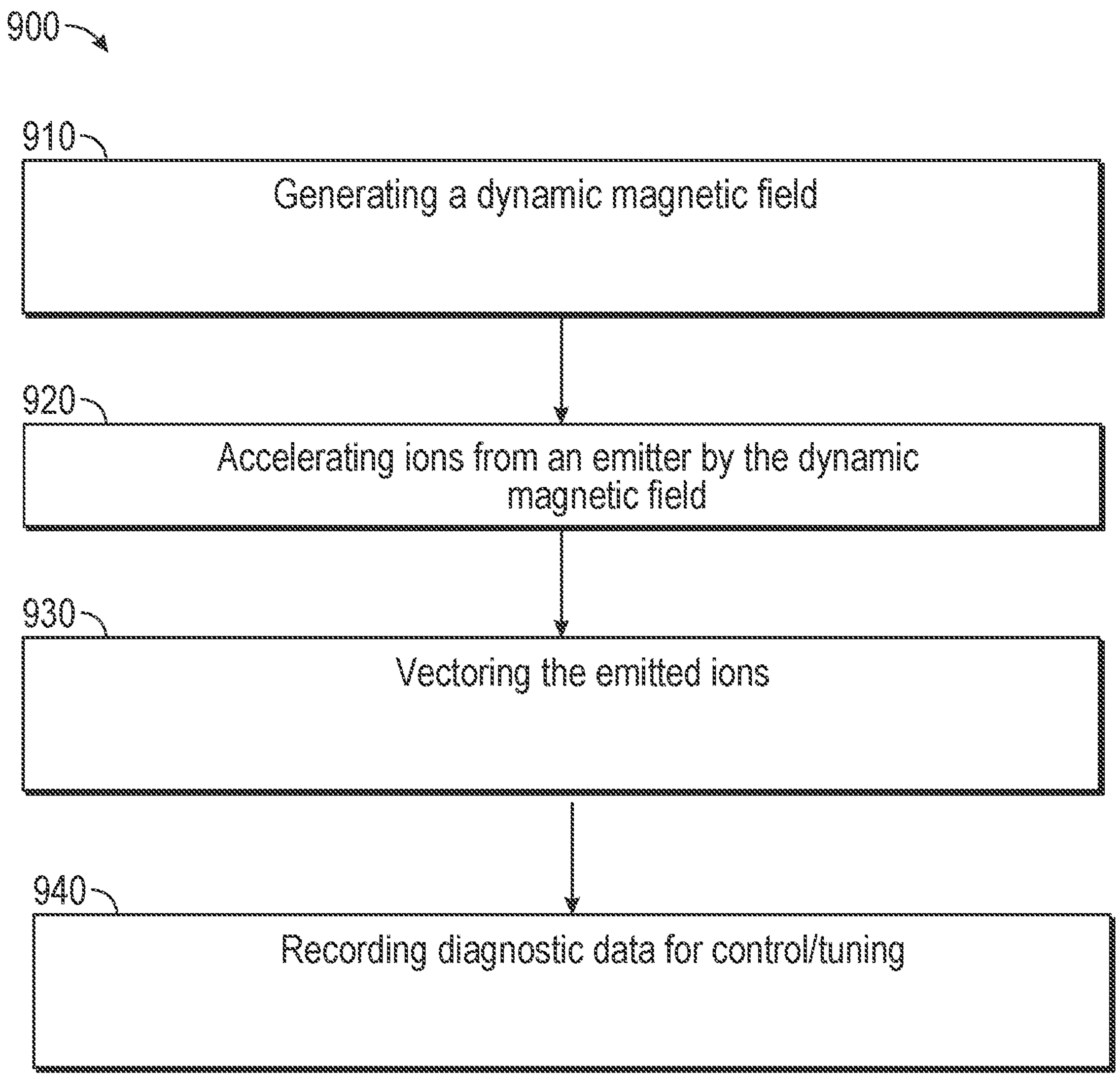
FIG. 9 is an example flow diagram illustrating an exemplary method(s) for generating thrust with an extractorless electrospray thruster, in accordance with various embodiments.

With reference now to FIG. 9, a method 900 may be configured to generate thrust via a magnetic electrospray thruster. In an example embodiment, method 900 may comprise generating a dynamic magnetic field (step 910). In an example embodiment, generating a dynamic magnetic field may comprise creating a drive signal and amplifying the drive signal to generate the magnetic field. The method 900 may further comprise accelerating ions from an emitter by the dynamic magnetic field to generate thrust. In a further example embodiment, the method 900 may comprise steering or vectoring the emitted ions (step 920) by independent control of multiple coils. This vectoring may be limited to the angle between the emitter direction (the direction perpendicular to the emitter plane on a line 660 from the emitter, and the coil itself (to reduce impingement on the coil.)) In an example embodiment, the method 900 may further comprise recording diagnostic data (step 940). The diagnostic data may comprise data related to the coil: current, temperature, inductance, and resistance. In another example embodiment, the data may comprise data related to the reservoir/emitter: conductance, fluid level and temperature. The data may, for example, be recorded over time. Moreover, any suitable data may be recorded. The data may be used for example, for controlling and tuning purposes.

One or more of the components of the system may include software, hardware, etc. The system and method may be described herein in terms of functional block components, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any or any combination of programming or scripting languages such as C, C++, C#, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQTM (formerly MQSeries) by IBM®, Inc. (Armonk, NY) is an example of a commercially available middleware product. An Enterprise Service Bus ("ESB")

For the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system or any part(s) or function(s) thereof may be implemented using hardware, software, or a combination thereof and may be implemented in one or more computer systems or other processing systems. However, the manipulations performed by embodiments may be referred to in terms, such as matching or selecting, which are commonly associated with mental operations performed by a human operator. No such capability of a human operator is necessary, or desirable, in most cases, in any of the operations described herein. Rather, the operations may be machine operations or any of the operations may be conducted or enhanced by artificial intelligence (AI) or machine learning. AI may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

In various embodiments, the embodiments are directed toward one or more computer systems capable of carrying out the functionalities described herein. The computer system includes one or more processors. The processor is connected to a communication infrastructure (e.g., a communications bus, cross-over bar, network, etc.). Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

The computer system also includes a main memory, such as random access memory (RAM), and may also include a secondary memory. The secondary memory may include, for example, a hard disk drive, a solid-state drive, and/or a removable storage drive. The removable storage drive reads from and/or writes to a removable storage unit in a well-known manner. As will be appreciated, the removable storage unit includes a computer usable storage medium having stored therein computer software and/or data.

In various embodiments, secondary memory may include other similar devices for allowing computer programs or other instructions to be loaded into a computer system. Such devices may include, for example, a removable storage unit and an interface. Examples of such may include a removable memory chip (such as an erasable programmable read only memory (EPROM), programmable read only memory (PROM)) and associated socket, or other removable storage units and interfaces, which allow software and data to be transferred from the removable storage unit to a computer system.

The computer system may also include a communications interface. A communications interface allows software and data to be transferred between the computer system and external devices. Examples of such a communications interface may include a modem, a network interface (such as an Ethernet card), a communications port, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, NY), various database products available from ORACLES Corporation (Redwood Shores, CA), MICROSOFT ACCESS® or MICROSOFT SQL SERVER® by MICROSOFT® Corporation (Redmond, Washington), MYSQL® by MySQL AB (Uppsala, Sweden), MONGODB®, Redis, Apache Cassandra®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

As used herein, big data may refer to partially or fully structured, semi-structured, or unstructured data sets including millions of rows and hundreds of thousands of columns. A big data set may be compiled, for example, from coil operation, current tracing over time between each coil pair, from internal data, or from other suitable sources. Big data sets may be compiled without descriptive metadata such as column types, counts, percentiles, or other interpretive-aid data points.

Specific information related to the protocols, standards, and application software utilized in connection with the internet is generally known to those skilled in the art and, as such, need not be detailed herein.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not for purposes of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, “each” refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

Systems, methods, and computer program products are provided. In the detailed description herein, references to “various embodiments,” “one embodiment,” “an embodiment,” “an example embodiment,” etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A device for emitting an electrospray of ionized particles comprising:

a reservoir for accommodating a volume of liquid media capable of being ionized;

an emitter in communication with the reservoir and comprising one or more openings disposed therethrough, wherein the one or more openings are configured to permit release of the liquid media, contained within the reservoir, in response to a dynamic magnetic field; and an element for generating the dynamic magnetic field that runs through the emitter, wherein the element is positioned off axis from the emitter, wherein the element for generating the dynamic magnetic field is configured to ionize the liquid media exiting the emitter and accelerate ionized particles exiting the emitter to a desired velocity.

2. The device as recited in claim 1, wherein the element for generating the dynamic magnetic field is a Helmholtz coil.

3. The device a recited in claim 2, wherein the element comprises two orthogonal Helmholtz coil pairs, wherein the two orthogonal Helmholtz coil pairs generate the dynamic magnetic field that induces an electric potential and causes ionized particles exiting the emitter to be propelled away from the device in a direction orthogonal to the pair of coils.

4. The device as recited in claim 1, wherein the element for generating the dynamic magnetic field comprises one or more moving magnets.

5. A method for emitting an electrospray of ionized particles at a desired velocity comprising generating, in an electrospray device, a desired dynamic magnetic field in the electrospray device that comprises an emitter to facilitate the release of a liquid media capable of being ionized therefrom, wherein in response to the dynamic magnetic field the liquid media is ionized and released from the emitter in the form of ionized particles, wherein the ionized particles are propelled away from the electrospray device at a desired velocity.

6. The method as recited in claim 5, wherein the step of generating the desired dynamic magnetic field is provided by an element of the electrospray device that is positioned away from an axis orthogonal to the emitter.

7. The method as recited in claim 6, wherein the element is one or more Helmholtz coils.

8. The method as recited in claim 7, wherein the element comprises a matched pair of Helmholtz coils with a coil driver comprising an in-line capacitor.

9. An electrospray thruster comprising:

a reservoir for accommodating a volume of liquid media capable of being ionized;

an emitter grid comprising a plurality of emitters, wherein each emitter of the plurality of emitters is in communication with the reservoir and comprises an opening disposed therethrough; and an element for causing the liquid media, from the reservoir, to be ionized from the emitter by a dynamic magnetic field.

10. The electrospray thruster of claim 9, wherein an amount of spacing between each emitter of the plurality of emitters is independent of the element.

11. The electrospray thruster of claim 9, wherein the electrospray thruster does not comprise an extractor grid.

12. The electrospray thruster of claim 9, wherein the electrospray thruster is an extractorless electrospray thruster.

13. The electrospray thruster of claim 9, wherein the element comprises an electromagnet for creating the dynamic magnetic field that emits ions from the emitter and accelerates the emitted ions to generate thrust.

14. The electrospray thruster of claim 9, wherein the electrospray thruster is configured to vector the emitted ions.

15. The electrospray thruster of claim 9, wherein the element comprises a coil pair for generating the dynamic magnetic field, and wherein a beam of emitted ions can be steered with the coil pair.

16. The electrospray thruster of claim 9, further comprising the plurality of emitters being on a single substrate, wherein the emitters on the single substrate can be vectored to thrust in a plurality of directions from a single fixed, relative to a vehicle, electrospray thruster.

17. The electrospray thruster of claim 16, wherein the electrospray thruster can thrust in a direction perpendicular to a plane of the single substrate and in a direction at an angle from the direction perpendicular to the plane of the single substrate, without moving the single substrate relative to the vehicle.

18. The electrospray thruster of claim 9, wherein the lifetime of an extractorless thruster is greater than a thruster with an extractor.

19. The electrospray thruster of claim 9, wherein the element comprises a magnetic coil.

20. The electrospray thruster of claim 10, wherein the element comprises a pair of magnetic coils.

21. The electrospray thruster of claim 9, wherein the pair of magnetic coils are located to cause the dynamic magnetic field to run through the emitter, off axis from an axis perpendicular to the emitter.

22. The electrospray thruster of claim 9, wherein the thrust to square foot ratio of an extractorless thruster is denser than a thruster with an extractor.

23. A device for emitting an electrospray of ionized particles comprising:

a reservoir for accommodating a volume of liquid media capable of being ionized;

an emitter in communication with the reservoir and comprising one or more openings disposed therethrough, wherein the one or more openings are configured to permit release of the liquid media, contained within the reservoir, in response to a dynamic magnetic field; and an element for generating the dynamic magnetic field that runs through the emitter, wherein the element is positioned off axis from the emitter;

wherein the element for generating the dynamic magnetic field comprises two orthogonal Helmholtz coil pairs, wherein the two orthogonal Helmholtz coil pairs generate the dynamic magnetic field that induces an electric potential and causes ionized particles exiting the emitter to be propelled away from the device in a direction orthogonal to the pair of coils.

24. A device for emitting an electrospray of ionized particles comprising:

a reservoir for accommodating a volume of liquid media capable of being ionized;

an emitter in communication with the reservoir and comprising one or more openings disposed therethrough, wherein the one or more openings are configured to permit release of a liquid media, contained within the reservoir, in response to a dynamic magnetic field; and an element for generating the dynamic magnetic field that runs through the emitter, wherein the element is positioned off axis from the emitter, wherein the element for generating the dynamic magnetic field comprises one or more moving magnets.

* * * * *